United States Patent [19]

Eichhorn

[11] 4,277,592

[45] Jul. 7, 1981

[54] N-VINYLAMIDE POLYMERS AND PROCESS FOR THEIR MANUFACTURE USING TWO TYPES OF INITIATORS

[75] Inventor: Wilfried Eichhorn, Königstein, Fed. Rep. of Germany

[73] Assignee: Hoechst Aktiengesellschaft, Frankfurt am Main, Fed. Rep. of Germany

[21] Appl. No.: 54,487

[22] Filed: Jul. 3, 1979

[30] Foreign Application Priority Data

Jul. 6, 1978 [DE] Fed. Rep. of Germany ....... 2829652

[51] Int. Cl.$^3$ .............................................. C08F 22/38
[52] U.S. Cl. ..................... 526/227; 526/218; 526/219; 526/230.5; 526/303; 526/305
[58] Field of Search ............... 526/303, 305, 218, 219, 526/227, 230.5

[56] References Cited

U.S. PATENT DOCUMENTS

| | | | |
|---|---|---|---|
| 3,207,732 | 9/1965 | Lynn | 526/303 |
| 3,696,085 | 10/1972 | Lederer | 526/303 |

*Primary Examiner*—Harry Wong, Jr.
*Attorney, Agent, or Firm*—Curtis, Morris & Safford

[57] ABSTRACT

A tertiary N-vinylamide is polymerized, optionally together with further monomers, in the presence of an aliphatic hydrocarbon, at a temperature of from 0° to 150° C., using two types of initiator one of which is insoluble and the other soluble in the hydrocarbon used. The pulverulent or granular polymer obtained has a diminished content of residual monomer. It is suitable as protective colloid or dispersing agent for emulsion or suspension polymerizations.

6 Claims, No Drawings

N-VINYLAMIDE POLYMERS AND PROCESS FOR THEIR MANUFACTURE USING TWO TYPES OF INITIATORS

It has been proposed to manufacture N-vinylamide polymers by polymerizing aliphatic tertiary N-vinylamides using peroxy compounds and/or azo compounds as catalysts in the presence of aliphatic hydrocarbons (cf. U.S. Pat. No. 3,696,085). The process disclosed in said patent has the drawback that the homo- or copolymers obtained in powder form still contain considerable amounts of residual monomers, which must be removed substantially by additional process steps as otherwise they would cause environmental pollution and could give rise to troubles in the further use of the polymers. Moreover, a high content of residual monomers reduces the polymer yield and thus impairs the economy of the process.

It is the object of the present invention to provide an improved process for the manufacture of N-vinylamide polymers which does not have the disadvantages of the known process and which makes it possible to synthesize N-vinylamide polymers having a low content of residual monomers.

The present invention, therefore, provides a process for the manufacture of an N-vinylamide polymer by polymerizing a tertiary N-vinyl-carboxylic acid amide, optionally in combination with a copolymerizable, olefinically unsaturated compound, in the presence of an inert aliphatic hydrocarbon at a temperature of from 0° to 150° C. and in the presence of free radical forming initiators, which comprises carrying out the polymerization in the presence of (a) an initiators which, under normal conditions, is soluble in the monomeric N-vinyl-carboxylic acid amide and insoluble in the hydrocarbon used and (b) an initiator which, under normal conditions, is soluble in the hydrocarbon used.

The present invention further provides N-vinyl-carboxylic acid amide polymers obtained by the process according to the invention.

By tertiary N-vinyl-carboxylic acid amides is meant compounds of the formula I

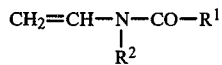   I in which $R^1$ means a hydrogen atom or a hydrocarbon radical having from 1 to 20, preferably from 1 to 8, carbon atoms and $R^2$ means an alkyl radical having from 1 to 20 carbon atoms, preferably 1 to 8 carbon atoms, which may be substituted by a completely alkylated amino group the alkyl radicals of which have from 1 to 4 carbon atoms each. The aforesaid hydrocarbon radical can be an aliphatic, a cycloaliphatic or an aromatic radical; preferably, it is an alkyl radical having from 1 to 6 carbon atoms.

N-vinyl-carboxylic acid amides to be used according to the invention are, for example N-vinyl-N-alkyl-formamides, N-vinyl-N-alkyl-acetamides, N-vinyl-N-alkyl-propionamides, N-vinyl-N-alkyl-butyramides and N-vinyl-N-alkylisobutyramides in which alkyl preferably means methyl, ethyl, propyl, isopropyl, or tert.butyl.

The N-vinyl-carboxylic acid amides are produced according to known processes, for example by reacting N-substituted carboxylic acid amides with acetylene in the liquid phase at a temperature of from 90° to 300° C. using a basic catalyst, for example alkali metals and alkali metal compounds of the aforesaid amides (cf. U.S. Pat. No. 3,324,177).

The process according to the invention can be used also for the manufacture of N-vinyl-carboxylic acid amide copolymers. Suitable comonomers are, in the first place, olefinically unsaturated compounds of the formula II

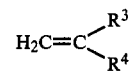   II in which $R^3$ means a hydrogen atom or a methyl radical and $R^4$ is a hydrogen atom, an alkyl radical having from 1 to 4 carbon atoms, an alkoxy radical having from 1 to 4 carbon atoms, an alkylcarboxyl radical having from 2 to 18 carbon atoms, preferably from 2 to 10 carbon atoms, a nitrile group, an aminocarbonyl radical, halogen, preferably chlorine, or an alkoxycarbonyl radical having from 2 to 12, preferably from 2 to 9, carbon atoms.

Suitable comonomers are especially (a) olefins such as ethylene, propylene and isobutylene; (b) vinyl ethers, for example vinylmethyl ether, and vinyl-n-butyl ether; (c) vinyl esters of aliphatic monocarboxylic acids, for example vinyl acetate, vinyl propionate, vinyl butyrate, vinyl laurate and vinyl decanate; (d) acrylonitrile and methacrylonitrile; (e) acryl amide and methacryl amide; (f) vinyl halides, for example vinyl chloride; (g) acrylic acid esters of monohydric alkanols, for example methyl acrylate, ethyl acrylate, butyl acrylate and 2-ethylhexyl acrylate; (h) methacrylic acid esters of monohydric alkanols, for example methyl-methacrylate, ethyl-methacrylate, butyl-methacrylate, hexyl-methacrylate, octyl-methacrylate and 2-ethylhexyl-methacrylate. Maleic acid diesters and fumaric acid diesters are likewise suitable, especially those of monohydric alkanols having from 2 to 10, preferably 3 to 8, carbon atoms, such as dibutyl maleate, dihexyl maleate, dioctyl maleate, dibutyl fumarate, dihexyl fumarate and dioctyl fumarate.

The inert aliphatic hydrocarbon to be used in the process according to the invention is generally a linear or branched alkane having from 3 to 20, preferably 4 to 10, carbon atoms, for example propane, butane, pentane, hexane, heptane, octane, nonane, or decane. The proportion by weight of hydrocarbon to monomer is in the range of from 20:1 to 0.5:1, preferably 10:1 to 1:1.

An essential feature of the invention is the use of two initiators of which (a) under normal conditions is soluble in the monomeric N-vinyl-carboxylic acid amide and insoluble in the hydrocarbon (HC) used, while (b) under normal conditions is soluble in the hydrocarbon used. In principle, it is insignificant to which class of chemical compounds the HC-insoluble and the HC-soluble initiators belong.

As monomer-soluble and HC-insoluble initiator an aliphatic azo compound or an organic peroxy compound is generally used. Examples of such azo compounds are azodiisobutyronitrile, azo-γ,γ'-bis(4-cyanovaleric acid) and azodicarbonamide. The HC-insoluble initiator is used in an amount of from 0.1 to 4, preferably 0.2 to 2, % by weight, calculated on the total monomer amount.

Suitable HC-soluble initiators are especially organic peroxy compounds, preferably an ester of a peroxy acid. Best results are obtained with esters of a branched alkanol having from 3 to 8, preferably 3 or 4, carbon atoms with percarbonic acid or with a monobasic aliphatic percarboxylic acid having from 4 to 12, preferably 4 to 8, carbon atoms, such as, for example, diisopropyl percarbonate, di-tert.butyl percarbonate, bis(2-ethyl-hexyl) percarbonate, isopropyl perisobutyrate, tert.butyl perisobutyrate, isopropyl perpivalate, tert.butyl perpivalate, isopropyl peroctoate and tert.butyl peroctoate as well as dilauroyl peroxide and dibenzoyl peroxide. The HC-soluble initiator is used in an amount of from 0.02 to 2.0, preferably 0.1 to 1.0, % by weight, calculated on the total monomer amount.

The precipitation polymerization according to the invention is generally carried out at a temperature in the range of from 0° to 150° C., preferably 40° to 120° C. It proved advantageous to operate under an inert gas, for example nitrogen or a noble gas such as argon.

The use of a regulator is not critical, but in some cases it may be advantageous. Suitable regulators are aliphatic mercaptans, lower aliphatic aldehydes and preferably organic peroxides which do not act as initiators under the reaction conditions, especially aliphatic mercaptans having from 4 to 16 carbon atoms, for example n-butyl-mercaptan, tert.butyl-mercaptan and n-dodecyl-mercaptan, and aliphatic aldehydes having from 2 to 4 carbon atoms, for example acetaldehyde, propionaldehyde and butyraldehyde, as well as tert.butyl-hydroperoxide.

According to a preferred embodiment of the process of the invention, the main quantity, preferably 60 to 80% by weight, of the inert aliphatic hydrocarbon is first introduced into the reaction vessel and heated to polymerization temperature, whereupon the N-vinyl-carboxylic acid amide, optionally together with a comonomer, the remainder of the inert aliphatic hydrocarbon, preferably 40 to 20% by weight thereof, the HC-insoluble initiator and optionally a regulator are metered in while keeping in motion the hydrocarbon in the reaction vessel; then the HC-soluble initiator is added and polymerization is completed by heating.

When the polymerization reaction is complete, the reaction mixture is cooled to room temperature and the polymer, which has separated as a powder or in granular form, is isolated and dried. To effect isolation the reaction mixture is preferably filtered and the polymer is dried at elevated temperature, preferably at 90° to 120° C., optionally under an inert gas.

The polymers manufactured by the process according to the invention can be used as protective colloids, as dispersion agents for emulsion and suspension polymerizations, as thickening agents and as textile auxiliaries.

The following examples illustrate the invention. The percentages are by weight unless otherwise stated. The content of residual monomer was determined by gas chromatography.

EXAMPLE 1

A 1 liter autoclave, provided with stirrer, heating and cooling jacket and scavenged with nitrogen, was charged with 390 g of n-hexane and, while stirring, the hydrocarbon was heated to 90° C. Within 3 hours a mixture of 155 g of N-vinyl-N-methyl-acetamide, 12 g of bis(2-ethylhexyl)-maleate, 135 g of n-hexane, 0.8 g of azodiisobutyronitrile and 0.4 g of tert.butyl-hydroperoxide were metered in. After addition of 1.2 g of tert.butyl peroctoate dissolved in 20 g of n-hexane, the reaction mixture was kept for 3 hours at 90° C. to complete polymerization. Next, the content of the autoclave was cooled to room temperature and the fine-grained copolymer was isolated by filtration. The moist copolymer still contained 42% of n-hexane and 0.8% of monomeric N-vinyl-N-methyl-acetamide. After drying for 30 minutes at 110° C., the copolymer, having little odor, merely contained 1.8% of volatile constituents, substantially N-vinyl-N-methyl-acetamide.

EXAMPLE 2

The procedure of Example 1 was repeated with the exception that only 0.6 g of tert.butyl peroctoate were used. The moist copolymer still contained 37% of n-hexane and 1.3% of monomeric N-vinyl-N-methyl-acetamide. After drying, copolymer, having little odor, contained only 2.6% of volatile constituents, substantially N-vinyl-N-methyl-acetamide.

EXAMPLE 3

The procedure of Example 1 was repeated with the exceptions that diisopropyl percarbonate was used instead of tert.butyl peroctoate and to complete polymerization the temperature was held at 70° C. instead of 90° C. The moist copolymer still contained 46% of n-hexane and 1.0% of monomeric N-vinyl-N-methyl-acetamide. After drying, the copolymer, having little odor, contained only 2.3% of volatile constituents, substantially N-vinyl-N-methyl-acetamide.

EXAMPLE 4

The procedure of Example 1 was repeated with the exceptions that tert.butyl perpivalate was used instead of tert.butyl peroctoate and to complete polymerization the temperature was held at 80° C. instead of 90° C. The moist copolymer still contained 38% of n-hexane and 1.2% of monomeric N-vinyl-N-methyl-acetamide. After drying, the copolymer, having little odor, contained only 2.5% of volatile constituents, substantially N-vinyl-N-methyl-acetamide.

COMPARATIVE EXAMPLE 1

The procedure of Example 1 was repeated with the exception that, in place of the solution of 1.2 g of tert.butyl peroctoate in 20 g of n-hexane, a suspension of 1.2 g of azodiisobutyronitrile in 20 g of n-hexane was used. The moist copolymer still contained 40% of n-hexane and 3.9% of monomeric N-vinyl-N-methyl-acetamide. After drying, the strongly smelling copolymer still contained 6.3% of volatile constituents, substantially N-vinyl-N-methyl-acetamide.

COMPARATIVE EXAMPLE 2

The procedure of Example 1 was repeated but, instead of the solution of 1.2 g of tert.butyl peroctoate in 20 g of n-hexane, a solution of 1.2 g of azodiisobutyronitrile in 10 g of N-vinyl-N-methyl-acetamide was used. The moist copolymer contained 36% of n-hexane and 3.7% of monomeric N-vinyl-N-methyl-acetamide. After drying, the intensely smelling copolymer still contained 6% of volatile constituents, substantially N-vinyl-N-methyl-acetamide.

EXAMPLE 5

A 1 liter autoclave provided with heating and cooling jacket and scavenged with nitrogen was charged with 390 g of n-heptane and 6 g of 2-ethylhexyl acrylate, and the mixture was heated to 90° C. while stirring. Within 3 hours a mixture of 155 g of N-vinyl-N-methyl-acetamide, 135 g of n-heptane and 0.6 g of azodiisobutyronitrile was then metered in. After addition of 1.0 g of tert.butyl peroctoate dissolved in 20 g of n-heptane, the reaction mixture was maintained for 3 hours at 90° C. to complete polymerization. Next, the content of the autoclave was cooled to room temperature, and the copolymer powder was isolated by filtration. The moist copolymer still contained 49% of n-heptane and 0.9% of N-vinyl-N-methyl-acetamide. After drying for 30 minutes at 110° C., the copolymer, having little odor, contained only 1.9% of volatile constituents, substantially N-vinyl-N-methyl-acetamide.

EXAMPLE 6

The procedure of Example 5 was repeated but without 2-ethylhexyl acrylate and with the use of tert.butyl perpivalate instead of tert.butyl peroctoate. The temperature during after-polymerization was 80° C. instead of 90° C. The moist N-vinyl-N-methyl-acetamide homopolymer still contained 43% of n-heptane and 1.4% of residual monomer. After drying, the copolymer, having little odor, contained only 2.8% of volatile constituents, substantially residual monomer.

COMPARATIVE EXAMPLE 3

The procedure of Example 5 was repeated but without addition of the tert.butyl peroctoate solution. The moist copolymer still contained 44% of n-heptane and 3.0% of monomeric N-vinyl-N-methyl-acetamide. After drying, the intensely smelling copolymer still contained 6.1% of volatile constituents, substantially N-vinyl-N-methyl-acetamide.

COMPARATIVE EXAMPLE 4

The procedure of Example 5 was repeated with the exception that 4.0% of a 30% aqueous solution of the sodium salt of 4,4-azo-bis(4-cyanovaleric acid) were used instead of the tert.butyl peroctoate solution. The moist copolymer still contained 41% of n-heptane, 1.6% of water and 2.9% of N-vinyl-N-methyl-acetamide. After drying, the intensely smelling copolymer still contained 6.6% of volatile constituents, substantially N-vinyl-N-methyl-acetamide.

The results of the above examples according to the invention and of the comparative examples are summarized in the following table.

| Example | HC-soluble initiator | VIMA* content in moist polymer (%) | volatile constituents in dry polymer (%) |
|---|---|---|---|
| 1 | tert.butyl peroctoate | 0.8 | 1.8 |
| 2 | tert.butyl peroctoate | 1.3 | 2.6 |
| 3 | diisopropyl percarbonate | 1.0 | 2.3 |
| 4 | tert.butyl perpivalate | 1.2 | 2.5 |
| comp. 1 | — | 3.9 | 6.3 |
| comp. 2 | — | 3.7 | 6 |
| 5 | tert.butyl peroctoate | 0.9 | 1.9 |
| 6 | tert.butyl perpivalate | 1.4 | 2.8 |
| comp. 3 | — | 3.0 | 6.1 |
| comp. 4 | — | 2.9 | 6.6 |

*VIMA = N-vinyl-N-methyl-acetamide

What is claimed is:

1. In a process for the manufacture of an N-vinylamide polymer by polymerizing a tertiary N-vinyl-carboxylic acid amide, or a tertiary N-vinyl-carboxylic amide in combination with a copolymerizable olefinically unsaturated compound, in the presence of an inert aliphatic hydrocarbon at a temperature of from 0° to 150° C., the improvement which comprises polymerizing in the presence of an initiator which, under normal conditions, is soluble in the monomeric N-vinyl-carboxylic acid amide and insoluble in the hydrocarbon and which is present in an amount of from 0.1 to 4 weight percent, calculated on the total monomer amount, and an additional initiator which, under normal conditions, is soluble in the hydrocarbon and which is present in an amount of from 0.02 to 2 weight percent, calculated on the total monomer amount.

2. A process as defined in claim 1, wherein the initiator which, under normal conditions, is soluble in the monomeric N-vinyl-carboxylic acid amide and insoluble in the hydrocarbon is an aliphatic azo compound or a peroxy compound which, under normal conditions, is soluble in the monomeric N-vinyl-carboxylic acid and insoluble in the hydrocarbon.

3. A process as defined in claim 1, wherein the additional initiator which, under normal conditions, is soluble in the hydrocarbon is an aliphatic azo compound or a peroxy compound which, under normal conditions, is soluble in the hydrocarbon.

4. A process as defined in claim 1, wherein the N-vinyl-carboxylic acid amide is a compound of the formula

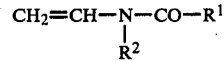

in which $R^1$ is hydrogen or a hydrocarbyl of from 1 to 20 carbon atoms and $R^2$ is an alkyl of from 1 to 20 carbon atoms or said alkyl substituted by a completely alkylated amino group.

5. A process as defined in claim 3, wherein the peroxy compound is an ester of a peroxy acid.

6. The process as defined in claim 3, wherein the peroxy compound is an ester of a branched alkanol of from 3 to 8 carbon atoms with percarbonic acid or a monobasic aliphatic percarboxylic acid of from 1 to 12 carbon atoms.

* * * * *